(12) United States Patent
Boivie

(10) Patent No.: US 7,302,705 B1
(45) Date of Patent: Nov. 27, 2007

(54) METHOD AND APPARATUS FOR TRACING A DENIAL-OF-SERVICE ATTACK BACK TO ITS SOURCE

(75) Inventor: Richard H. Boivie, Monroe, CT (US)

(73) Assignee: International Business Machines Corporation, Armonk, NY (US)

( * ) Notice: Subject to any disclaimer, the term of this patent is extended or adjusted under 35 U.S.C. 154(b) by 1114 days.

(21) Appl. No.: 09/651,619

(22) Filed: Aug. 30, 2000

(51) Int. Cl.
G06F 15/18 (2006.01)
G06F 15/177 (2006.01)
G06F 15/16 (2006.01)
G08B 29/00 (2006.01)
H04L 9/00 (2006.01)
H04K 1/00 (2006.01)

(52) U.S. Cl. .................. 726/22; 726/23; 726/34; 713/153; 380/2; 709/221; 709/229

(58) Field of Classification Search ........... 713/201, 713/200
See application file for complete search history.

(56) References Cited

U.S. PATENT DOCUMENTS

| | | | | |
|---|---|---|---|---|
| 5,963,540 A | * | 10/1999 | Bhaskaran | 370/218 |
| 6,061,798 A | * | 5/2000 | Coley et al. | 713/201 |
| 6,167,444 A | * | 12/2000 | Boden et al. | 709/223 |
| 6,298,041 B1 | * | 10/2001 | Packer | 370/231 |
| 6,456,597 B1 | * | 9/2002 | Bare | 370/252 |
| 6,502,135 B1 | * | 12/2002 | Munger et al. | 709/225 |
| 6,529,515 B1 | * | 3/2003 | Raz et al. | 370/401 |
| 6,535,507 B1 | * | 3/2003 | Li et al. | 370/356 |
| 6,535,855 B1 | * | 3/2003 | Cahill et al. | 705/1 |
| 6,578,147 B1 | * | 6/2003 | Shanklin et al. | 713/200 |
| 6,636,509 B1 | * | 10/2003 | Hughes | 370/389 |
| 6,654,882 B1 | * | 11/2003 | Froutan et al. | 713/153 |
| 6,735,702 B1 | * | 5/2004 | Yavatkar et al. | 713/201 |
| 6,772,334 B1 | * | 8/2004 | Glawitsch | 713/153 |
| 6,779,033 B1 | * | 8/2004 | Watson et al. | 709/227 |
| 6,906,709 B1 | * | 6/2005 | Larkin et al. | 345/419 |
| 7,062,782 B1 | * | 6/2006 | Stone et al. | 726/22 |

FOREIGN PATENT DOCUMENTS

EP        1708538 A1  * 10/2006
WO    WO 2005120004 A1 * 12/2005

OTHER PUBLICATIONS

Fulp et al, Preventing Denial of Service Attacks on Quality of Service, 2001, IEEE, pp. 159-172.*
Weiler, Nathalie, Honeypots for Distributed Denail of Service Attacks, 2002, IEEE, pates 109-114.*
Advani, Dilip, Oculan OpticNerve Keeps watch, Jan. 2003, Network Computing, pp. 24 and 26.*

* cited by examiner

*Primary Examiner*—Ayaz Sheikh
*Assistant Examiner*—Aravind K Moorthy
(74) *Attorney, Agent, or Firm*—Ohlandt, Greeley, Ruggiero & Perle, L.L.P.; Daniel P. Morris, Esq.

(57) ABSTRACT

A backtracking method, program and unit that involves a traceback computer program for tracking a denial-of-service attack on a victim machine, v, back toward the source of the denial-of service attack. The traceback program determines a set of routers that are upstream neighbors of v and determines which of those neighbors is the principal source of packets flowing to v. After determining the identity of the neighbor node, n, that is the principal source of packets flowing to v, the traceback program continues further upstream from n to determine the upstream neighbor of n that is the principal source of packets to v. After determining this upstream neighbor, the program continues further upstream until the source of the denial-of-service packets is determined.

23 Claims, 2 Drawing Sheets

METHOD AND APPARATUS FOR TRACING A DENIAL-OF-SERVICE ATTACK BACK TO ITS SOURCE

FIELD OF THE INVENTION

This invention relates generally to data communications networks including, but not limited to, the Internet and World Wide Web (WWW), and more specifically relates to methods and apparatus for tracing malicious behavior back to its source or sources. The teachings of this invention are particularly useful with that type of malicious behavior known as a denial-of-service attack.

BACKGROUND OF THE INVENTION

Recently there have been a number of so-called "denial-of-service" attacks on servers of various WWW sites, or simply "web" sites. These attacks overwhelm the server with maliciously-generated traffic whose only purpose is to temporarily shut down the server, and, hence, the web site. As can be appreciated, even a temporary suspension of service in a high volume commercial web site can result in a significant loss of revenue to the operator of the web site.

When a denial-of-service attack occurs it is desirable be able to trace the attack back to the machine (or machines) where the attack originated. However, the attacker may attempt to obscure the identity of the source of the attack. A need thus exists to provide a network with an ability to determine a source or sources of maliciously-generated traffic.

OBJECTS AND ADVANTAGES OF THE INVENTION

It is a first object and advantage of this invention to provide an improved data communications network having an ability to determine a source of a denial-of-service attack.

It is a further object and advantage of this invention to provide a denial-of-service attack tracing method, program and unit that is capable of tracing an attack back through a plurality of routers to the source of the attack.

SUMMARY OF THE INVENTION

The foregoing and other problems are overcome and the objects and advantages are realized by methods and apparatus in accordance with embodiments of this invention.

A method is disclosed for determining an identity of a source of undesirable packets received from a data communications network. The method includes steps of (i) operating a traceback function to receive at least one and possibly two input parameters, (a) a network address (v) of a device receiving the undesirable packets and (b) a network address (r) of a packet router that is coupled to the device immediately upstream of the device; (ii) determining a set of network routers that are neighbors (n) of r; and (iii) querying individual ones of packet routers in order to determine a packet router that is a largest source of packets addressed to v via r, and continuing to query packet routers up through a hierarchy of interconnected packet routers until an identity of a source of the undesirable packets is discovered, or until further backtracing becomes impossible or impractical. The step of operating the traceback function may operate the traceback function on a plurality of selected paths, where a particular path is selected based at least on an amount of traffic (volume) flowing through the path to or towards v.

A backtracking or traceback unit and method is also disclosed for tracing a denial-of-service attack on a victim machine, such as a server, back to its source. The backtracking unit includes a data processor that is responsive to a traceback computer program stored on a computer-readable media for receiving a first input parameter of an IP address (v) of the victim machine and a second input parameter of an IP address (r) of a router that is immediately upstream of the victim machine. The traceback computer program controls the operation of the data processor to determine a set of routers that are neighbors (n) of r and, for each neighbor n of r to determine it r is n's next-hop for traffic addressed to v, where node n's next-hop for traffic addressed to v is the IP address of the node that n will forward a packet to if the destination address in the packet is v. The traceback computer program further controls the operation of the data processor, for the case where r is not n's next-hop for traffic addressed to v, to skip over n and to query the next neighbor of r, while for the case where r is n's next-hop for traffic addressed to v, to determine an amount of traffic that n is forwarding to r that is addressed to v. After determining the identity of the neighbor n of r that is the principal source of packets flowing to r that are addressed to v, the data processor continues further upstream from the determined neighbor n of r that is the principal source of packets flowing to r that are addressed to v to continue to traceback through interconnected routers until a source of denial-of-service attack packets to v is determined.

In one embodiment the data processor operates to send at least one Simple Network Management Protocol (SNMP) query to r to obtain information from a MIB, such as an ip forwarding table MIB, that stores IP addresses of routers that are neighbors of r. The data processor also operates to send at least one SNMP query to an IP Forwarding Table MIB of router n. It should be realized that the teachings of this invention are not limited for use with SNMP messages, and that other types can be used, as those skilled in the art should realize.

The data processor, while determining an amount of traffic that n is forwarding to r that is addressed to v, operates under control of the traceback computer program to send, in one embodiment, a first SNMP message to a neighbor router n instructing router n to count the number of packets that it is sending to router r that are addressed to v, and further operates to send a second SNMP message to router n to query router n as to how many packets it has sent to router r addressed to v. In another embodiment, where a packet router is already counting packets that it forwards, a first message can be sent to request the packet count and a second message can be sent later to request the count again. By subtracting the first count from the second count one is enabled to determine how many packets were forwarded during a certain interval. In a further embodiment the router may maintain a count of how many packets were sent during some interval, such as one second. In this case the message sent to the packet router may simply request this number. In a further embodiment the packet router is instructed to install a host route to the victim that tracks the existing route, and then query the packet router to determine the number of packets that were forwarded using the more specific host route.

The backtracking unit may also take corrective action by, for example, establishing a black hole host route to v as close as is possible to the source of the denial-of-service attack packets, and/or by establishing a special host route to v using the same next hop as an existing route, where the special host route tracking changes in the existing route such that when a next hop for the existing route changes, the next hop for the host route changes similarly, and/or by establishing a rate-limit, for packets addressed to v, as close as is possible to the source of the denial-of-service attack packets.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

It is first noted that in copending and commonly assigned U.S. patent application Ser. No. 09/650,524, filed on even date herewith, entitled "Method for Protecting Web Servers Against Various Forms of Denial-of-Service Attacks", the inventor teaches several techniques for defending against an occurrence of a denial-of-service attack. The disclosure of this commonly assigned U.S. patent application is incorporated by reference herein in its entirety. It is further noted that the malicious traffic (e.g., denial-of-service attack) traceback teachings of this invention may be used in conjunction with the various techniques for protecting against such attacks disclosed in the commonly assigned patent application, as well as with other types of defensive mechanisms. For example, once a server or a firewall or a router determines that a denial-of-service attack is underway, and defensive mechanisms are deployed or are being deployed, the teachings of this invention can be used to traceback to the source of the denial-of-service attack.

Figure 1:
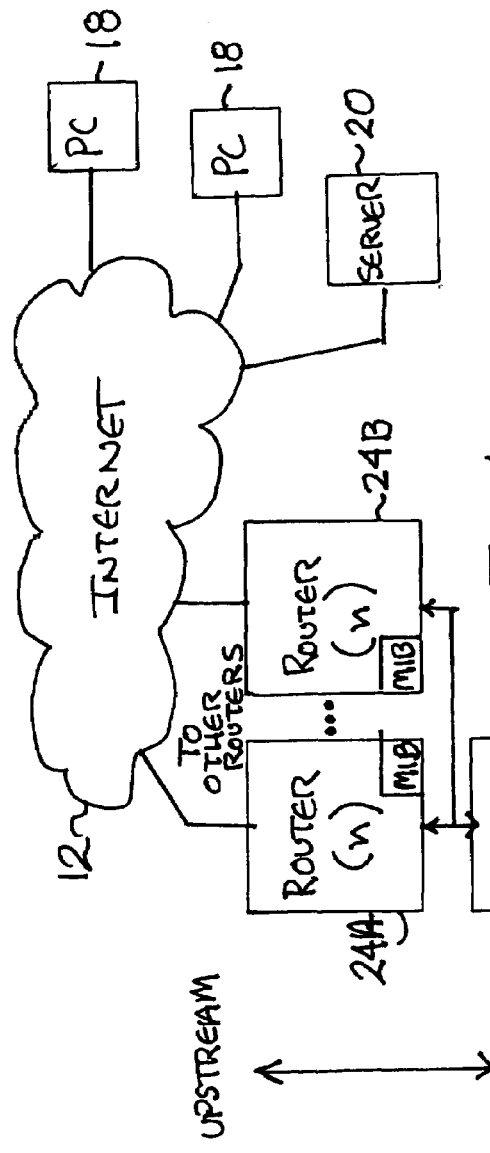
FIG. 1 is a simplified diagram of a data communications network and related components, including servers and routers.

FIG. 1 is a simplified illustration of a data communications network 10, which may be coupled to the Internet 12. The network 10 may be referred to as an enterprise network. A server 14 is bidirectionally coupled to the network 10 and receives traffic therefrom, and outputs traffic thereto. The traffic is comprised of packets that conform, in the presently referred embodiment, to the well-known TCP/IP protocol. Also coupled to the server 14, via the Internet 12 and the data communications network 10, are a plurality of user terminals and computers, such as workstations and personal computers (PCs) 18, as well as other servers 20. Firewalls 22 and routers 24 are also typically present. The router 24 will typically have nearest neighbor routers 24A, 24B etc., and has knowledge of the identities of its nearest neighbor routers (as explained below in the discussion of MIBS). It is assumed that server 14 is a target of malicious traffic launched from one or more of the computers 18 and/or servers 20, i.e., that the server 14 is the target of a denial-of-service attack.

Before proceeding further with a description of the denial-of-service traceback method and apparatus of this invention, a number of definitions are first given for terms and phrases that have appeared and that will appear in the ensuing detailed description, or that are related to these teachings.

These various terms and phrases are useful in gaining an understanding of the various types of denial-of-service attacks that a particular server 14 may be subjected to.

IP:
Internet Protocol.

TCP:
TCP is the Transmission Control Protocol. TCP is used to provide a "reliable" connection between two nodes in an internet. TCP uses sequence numbers, checksums, acknowledgments (or ACKs) and retransmissions of lost or garbled data to provide reliability. TCP is used by applications where it is important to deliver bytes correctly, such as mail, web browsing etc.

UDP:
UDP is the User Datagram Protocol. UDP does not provide sequence numbers, checksums, ACKs, retransmissions or reliability. It is used by those applications in which the "timeliness" of packet delivery is important, and the retransmission of lost or garbled data is not important. IP telephony is an example in which the timeliness of packet delivery is important and the retransmission of lost or garbled packets is not useful.

TCP SYN:
TCP uses TCP SYN packets to initiate a TCP connection.

TCP ACK:
TCP uses ACK packets to acknowledge the successful receipt of (ungarbled) data.

A TCP connection is set up with a 3-way "handshake", as follows.

(a) The initiator sends a SYN packet that includes some "Synchronizing" information.

(b) The server responds with a SYN packet that includes some Synchronizing information of its own. The server's SYN packet also ACK's the Synchronizing information that was received from the initiator.

(c) The initiator ACK's the information in the server's SYN packet.

TCP FIN:
TCP uses TCP FIN packets to close a TCP connection.

SYN Bit On, ACK bit Off
The SYN Bit in the TCP header is On and the Ack Bit is Off in the first packet in the 3-way handshake, described above, that is used to initiate a new TCP connection.

TCP Connection/Watching SYNs and FINs
A TCP connection has two "ends", where each is defined by an IP address and a TCP port number. A TCP connection is established in a 3-way handshake as described above. A TCP connection is ended via a 3-way exchange of FIN (French for "end") packets. If one keeps track of the SYN and FIN exchanges one can determine if a TCP packet is part of a legitimate TCP connection, or if it is a packet sent from an attacker that should be discarded.

Partially Established TCP Connection:
A TCP connection that is not completely established, i.e., one which is waiting for the third packet (ACK) in the 3-way handshake.

Random Early Drop:
Random Early Drop is a defense against a TCP SYN attack. When a new TCP SYN arrives, the TCP implementation in a server 14 checks to determine if any free TCP control blocks are available. If so, it allocates one to the new connection. If not, it uses a TCP control block from a "Partially Established" TCP connection. Since "real" TCP connections will not normally stay in the "partially established" state for very long, because the third packet in the 3-way handshake will normally arrive "shortly" after the sending of the second packet in the 3-way handshake, the re-use of the "partially established" TCP connection's control block will normally not impact legitimate traffic, but it will reclaim control blocks so that they can be used for legitimate TCP connections.

Denial-of-Service Attack:

A set of one or more packets that is sent to a web site or other site on the Internet for the purpose of "bogging down" or disabling the site.

Ping Attack:

An attack in which the attacker attempts to "bog down" a site by sending it a stream of "ping" packets. A ping is an icmp echo request packet (considered herein to be a non-TCP packet). A node is expected to respond to an icmp echo request with an icmp echo response. A ping is normally used to determine if a host is up and if the path to and back from the host is working. However, if an attacker sends large numbers of pings very rapidly, the host can become bogged down and it may be difficult for the host to provide service to legitimate users.

Smurf Attack:

An attack in which the attacker sends "broadcast" ping packets to a number of machines with a forged source address such that the source address in the packet is that of the "target" machine or server, i.e., the server that the attacker wants to disable. When a broadcast ping is received by the presumably large number of machines, they each respond to the ping by sending an echo reply to the address that was in the source address field in the broadcast ping packet. Since the source address is that of the target server, the target server becomes overwhelmed with large numbers of echo replies. The target server discards these echo replies, but the load on the target server node and the load on the link connecting the target server node to the network is large, such that the load can bog down both the target server node and the link.

TCP SYN Flood:

A TCP SYN flood attack operates as follows. The attacker sends a large number of TCP SYNs to the target server 14. The attacker typically uses fake source addresses in these packets so that the attacker cannot readily be traced. The attacker also typically uses a different source address in each packet to make it difficult for the target server 14 to know that it is the subject of a TCP SYN attack. Each time a SYN is received, the target server 14 responds with the second packet (SYN) in the 3-way handshake. It also allocates some "resources" (e.g., a TCP control block that is to be used to keep track of the TCP connection). If enough TCP SYNs arrive at the target server 14, a considerable amount of resources become allocated and thus unavailable for handling legitimate traffic, and these allocated resources are not freed for some time, as the target server 14 is expecting the third packet (the ACK from the initiator) in the 3-way handshake. However, in this case the third ACK packet never arrives, nor does the expected real TCP exchange of data. Since the third packet of the handshake is never received, the allocated resources remain allocated for some time, until the target server 14 eventually frees them. If enough resources are allocated and remain allocated, the resources of the target server 14 become depleted, and the target server 14 is not able to respond to legitimate traffic.

UDP Flood:

An attack in which the attacker sends large numbers of UDP packets to the target server 14. A UDP flood is similar to a ping attack.

TCP ACK Flood:

An attack in which the attacker sends a flood of TCP packets in which the ACK flag is set. The ACK flag is normally set to acknowledge the reception of ungarbled data, but an attacker may set the ACK flag in a flood of packets in an attempt to make the packets appear to be part of an established TCP connection. In this way the attack packets are not filtered out by the firewall 22.

Firewall:

A firewall is the unit 22 that sits between the Internet 12 and the server 20 or between the Internet 12 and the enterprise network 10 to protect the server or the enterprise network 10 from various forms of Internet-borne attacks.

Rate Limiting:

Rate limiting limits the rate (packets per unit of time) at which certain types of packets are admitted to a network 10 or to a server 14, 20. Rate limiting is used to defend against certain forms of attack. For example, it's useful to admit ping packets so that one can trouble-shoot network problems. But it's not usually important that a server be able to respond to, for example, a million ping packets per second. So one may arrange, as described below, the network such that the firewall 22 or the router 24, for example, limit the rate at which ping packets or UDP packets arrive at the server 14 to protect the server from ping attacks, smurf attacks and UDP attacks. Note that one would not normally wish to rate limit TCP traffic at a web site, since this would slow down legitimate web traffic.

Wire-Speed

The ability to process packets as fast as they arrive from the network.

Simple Network Management Protocol (SNMP)

The SNMP is used to manage IP networks. SNMP queries are sent to routers and other IP-based devices to obtain various kinds of management information. Management information is stored in the form of MIB's. The SNMP specification may be found at http://www.rfc-editor.org/rfc/rfc1157.txt. As will be made evident below, this invention may use SNMP queries, but is not limited for use with only SNMP queries and messages.

Management Information Base (MIB)

A MIB is a collection of related pieces of information. The router 24 of FIG. 1 is assumed to have a MIB for each of the routing protocols that it implements. Routing protocols are used to exchange routing information with other routers. OSPF, RIP and BGP are examples of routing protocols. A router that implements the OSPF routing protocol supports the OSPF MIB. Similarly, a router that implements the BGP protocol supports the BGP MIB. The route protocol MIBs on a given router r contain, among other things, the IP addresses of routers 24A, 24B, etc. that are neighbors of r. It is noted that the description of the MIB for the IP forwarding table may be found at http://www.rfc-editor.org/rfc/rfc1354.txt.

As is shown in FIG. 1, in a presently preferred embodiment of this invention a denial-of-service attack (DOSA) traceback unit 15 is installed in the target server 14, or in a router 24. The DOSA traceback unit 15 could also be installed in the (optional) firewall 22.

In the preferred embodiment the DOSA traceback unit 15 is embodied as computer program code, stored on a computer-readable media such as a disk or in a semiconductor memory device 15B, that is executable by a computer or data processor 15A that forms a part of, by example, at least one of the server 14, the router 24, or the firewall 22. The processor 15A could be a dedicated processor for this purpose, or the processor 15A could be an already present data processor that runs in the server 14 or router 24 or firewall 22, and that is programmed to implement the DOSA functionality as described herein.

Figure 2:
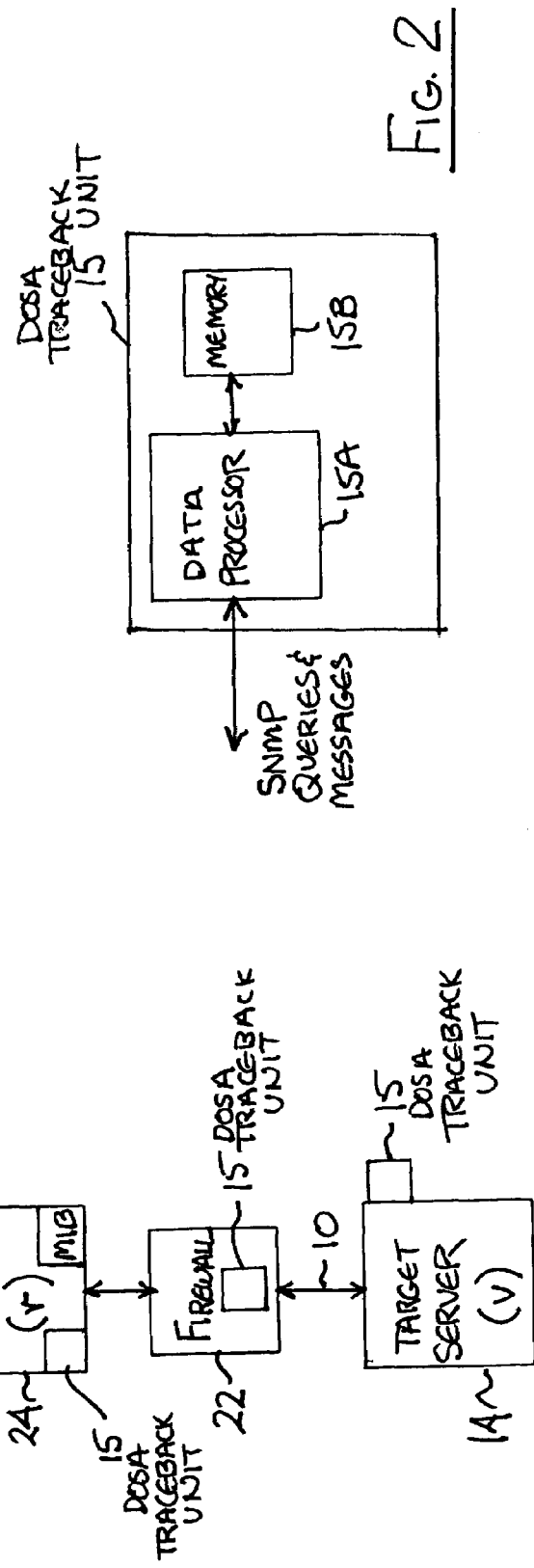
FIG. 2 is a block diagram of a denial-of-service attack traceback unit in accordance with the teachings of this invention.
Figure 3:
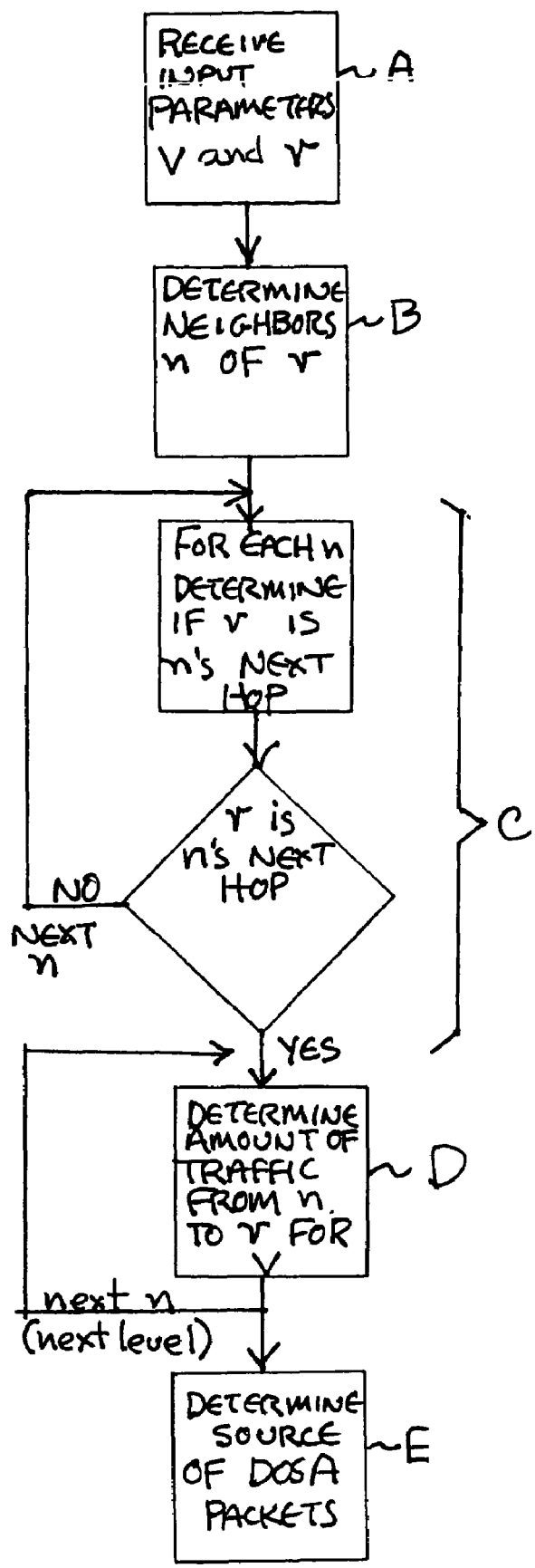
FIG. 3 is a logic flow diagram depicting a method executed by the denial-of-service attack traceback unit of FIG. 2.

Referring to the logic flow diagram of FIG. 3, the DOSA traceback unit 15 of FIGS. 1 and 2 operates as follows.

In a simplest case, at Step A a traceback program takes two input parameters, (a) the IP address of the victim machine, assumed for this example to be the target server 14, and (b) the IP address of the router that is immediately upstream of the target server 14. The first input parameter may be referred to as v, and the second input parameter may be referred to as r.

Step B determines the set of routers that are "neighbors" of r. The neighbors of a given router, r, can be determined by sending SNMP queries to r. As was explained above, SNMP is the Simple Network Management Protocol that is used to manage IP networks. SNMP queries are sent to routers and other IP-based devices to obtain various kinds of management information that is stored in the form of MIBs. The MIBs on a given router r include the IP addresses of routers that are neighbors of r. As such, the neighbors of the router, r, can be determined by sending SNMP queries to r.

It should be noted that the teachings of this invention are not limited for use with SNMP messages, and that other message types and protocols can be used as those skilled in the art should realize.

At Step C, for each neighbor n of r, determine if r is n's "next-hop" for traffic addressed to v, where node n's "next-hop" for traffic addressed to v is the IP address of the node that n will forward a packet to if the destination address in the packet is v. This determination can be made by sending SNMP queries to router n (in this case, to query router n's IP Forwarding Table MIB).

At Step D, if r is not n's next-hop for traffic addressed to v, then skip over n and go on to the next neighbor of r. On the other hand, if r is n's next-hop for traffic addressed to v, a determination is made as to how much traffic n is forwarding to r that is addressed to v. This can be determined by sending another SNMP query to n. However, since n may not be keeping track of how many packets that it is sending to r that are addressed to v, several SNMP messages may be used to accomplish this step. The first SNMP message tells n to count the number of packets that it is sending r addressed to v. And the second SNMP message, which is sent at some later time, queries n as to how many packets it has sent to r addressed to v. Step D is performed for each of the neighbors of r.

In another embodiment, where a packet router n is already counting packets that it forwards, a first message can be sent to request the packet count and a second message can be sent later to request the count again. By subtracting the first count from the second count one is enabled to determine how many packets were forwarded during a certain interval. In a further embodiment the router may maintain a count of how many packets were sent during some interval, such as one second. In this case the message sent to the packet router may simply request this number. In a further embodiment the packet router is instructed to install a host route to the victim that tracks the existing route, and then one may query the packet router to determine the number of packets that were forwarded using the more specific host route.

Once the method determines the identity of the neighbor of r that is the principal source of packets flowing to r that are addressed to v, the process is continued one node further upstream. For example, if it is determined that node s is the neighbor of r that is forwarding most of the packets addressed to v, the method attempts to determine the identity of the neighbor of s that is the source of most of the packets addressed to v that are being sent to s.

This process is then continued back through the interconnected routers until the source of the malicious traffic packets is determined (Step E), or until further backtracking becomes impossible. For example, the operator of network A may backtrack to a network A router that is closest to the source, while the ultimate source of the malicious traffic may be located further upstream in network B. In this case network A may not have the necessary access permissions and visibility in network B to continue backtracking. Rate limiting can be useful in this case, where traffic addressed to v can be limited (including legitimate traffic) while network B attempts to backtrack to the ultimate source. When the actual source is found the offending machine can be disconnected, and/or other appropriate action can be taken.

An example of pseudocode for an embodiment of the traceback program executed by the DOSA unit 15 data processor 15A is as follows:

```
/*
 * traceback - trace a denial of service attack back to a source
 *
 * usage: traceback host router
 *        where host is the ip address of the machine under attack
 *        and router is the ip address of the router that is immediately
 *        upstream of the machine under attack
 */
main(argc, argv)
    int argc;
    char *argv[];
{
    h = argv[0];
    r = argv[1];
    do {
        print (r);
        r = upstream(h, r);
    } while r != NULL);
}
upstream(h, r)
    ip_address h;
    ip_address r;
{
    /*
     * initialize variables needed to determine the next
     * node upstream that the attack is coming from
     */
    next_node = NULL;
    max_traffic = 0;
    /*
     * determine the routers that are "neighbors" of router r
     * by looking at the MIBs on r (e.g. the OSPF MIB, RIP MIB,
     * BGP MIB etc.)
     */
    n = the number of routers that are neighbors of r;
    for (i = 0; i < n; i++){
        nbr = the ith neighbor of r;
        /*
         * then for each neighbor, nbr, determine if nbr is
         * upstream of r for traffic headed for v. This is done by
         * sending snmp queries to nbr to determine if r is nbr's
```

```
             -continued

* next hop for traffic that is going to v. This information
        * is assumed to be available in the IP forwarding MIB.
        */
    if (nbr is upstream of r for traffic going to v){
            /*
            * do another snmp query to determine how
            * much traffic nbr is sending to v thru r.
            * if insufficient information in existing MIBs.
            * then add new MIB variable (e.g., traffic)
            */
            traffic = the amount of traffic that nbr is currently
            sending
                    to v thru r
            /*
            * keep track of the upstream neighbor that is
            * the largest source of this traffic
            */
            if (traffic > max_traffic){
                    max_traffic = traffic;
                    next_node = nbr;
            }
    }
}
/*
* finally, return the upstream neighbor that is the principal source
    of traffic
*/
    return (next_node);
}
```

A denial-of-services attack may actually be a coordinated attack from a large number of sources. To handle this case the traceback program may be designed in such a way that it can trace multiple attacks upstream, along multiple paths, if the volume of traffic to the victim server 14 is above a certain threshold on those paths. This can be done by adding a simple recursive function to the pseudocode implementation shown above.

Once the method has identified the source machine, or the router closest to the source machine, additional actions or corrective measures can be taken. For example, and in addition to notifying the proper authorities, a "black hole" host route to the victim machine 14 can be added on the router 24 closest to the source machine so that malicious packets addressed to the victim machine 14 are routed into a "black hole". Note that if one is to route packets addressed to the victim machine 14 into a black hole, it is preferable to accomplish this as close to the source, and as far from the victim, as possible to minimize the impact on legitimate traffic. A "black hole" route, if added for a particular IP address, implies adding a route table entry that tells the router 24 that packets addressed to that address should be routed "into a black hole" or dropped. A purpose of the "black hole" route is to eliminate the "denial of service" attack packets that are being sent to the victim machine 14. As was stated, in order to minimize the impact of legitimate traffic, it is desirable to establish the black hole route as close to the source of the attack packets as possible. Ideally, the black hole route should be established at the machine that is the source of the attack packets.

Another corrective measure involves regulating (i.e., slowing down or rate-limiting) the flow of traffic to the victim machine 14 on the router 24 closest to the source. As with the previous corrective measure, if one is going to slow down the flow of traffic to the victim machine 14, it is preferred to do this as close to the source and as tar from the victim machine as is practical in order to minimize the impact on legitimate traffic It should be noted that the router 24 that is closest to the source of the malicious traffic in a given ISP might still be a number of hops or a number of ISP's away from the ultimate source of the malicious traffic. As such, a given ISP may not be able to identify the ultimate source of the attack, but it can still limit the damage in a way that tends to minimize the impact on traffic from other sources.

It is within the scope of these teachings to add a special host route to the victim machine or target server 14 on the routers 24. This special host route preferably uses the same next hop as the existing route that covers the address of the target server 14, and it also tracks changes in the existing route so that when the next hop for the route changes, the next hop for the host route changes similarly. This special host route is useful in several ways. For example, it allows one to distinguish traffic to the target server 14 from other traffic that uses the same net route in tracing an attack back to its source. Second, the special host route can also be used to slow or rate-limit the flow of traffic to the target server 14 without impacting traffic to other destinations that are covered by the same net route. To implement the special host route on a router or to utilize rate limiting on the host route, as described above, one would presumably require appropriate access authorization to "control" the router. As such, these tools may be limited to the owner of a certain network. On the other hand, the tools do provide the owner of the network with the ability to get closer to the source of the attack and to limit the damage.

In general, the special host route would be setup with same next-hop as the existing route that covers, or includes, the address of the target machine. The host route is employed only for the target server or victim. The host route would preferably track changes that are made to the existing route so that traffic for the host would continue to follow an appropriate path when routes change. However, using a separate route for the host provides several opportunities. For example, when the router forwards packets it may increment a counter when it uses a particular route, enabling the count of packets sent to the victim to be maintained. If the host route were not separated, then one may possibly only be able to count packets going to the network that the victim is attached to, although in some cases this may be adequate since the attack packets may constitute the majority of the traffic going to v's network. Also, the use of the host route enables rate limiting to be used on the host route, and thus avoiding unnecessarily applying rate limiting to other hosts that are on the same network.

Note should be made that while the invention has generally discussed the use of two input parameters to the traceback function, i.e., (a) an IP address (v) of the victim machine and (b) an IP address (r) of a router that is immediately upstream of the victim machine, if the traceback program or function is executed on a router or firewall that is upstream of the victim, one may require only one input parameter, namely the IP address of v.

Thus, while the invention has been particularly shown and described with respect to preferred embodiments thereof, it will be understood by those skilled in the art that changes in form and details may be made therein without departing from the scope and spirit of the invention.

What is claimed is:

1. A method for tracing a denial-of-service attack on a victim machine back towards its source, comprising steps of:

operating a traceback program on at least one path to
      receive two input parameters, (a) an IP address (v) of the victim machine and (b) an IP address (r) of a router that is immediately upstream of the victim machine;

determining a set of routers that are neighbors (n) of r;

for each neighbor n of r, determining if r is n's next-hop for traffic addressed to v, or to a network that v is on, where node n's next-hop for traffic addressed to v is the IP address of the node that n will forward a packet to if the destination address in the packet is v;

if r is not n's next-hop for traffic addressed to v, skip over n and query the next neighbor of r, while if r is n's next-hop for traffic addressed to v, determining an amount of traffic that n is forwarding to r that is addressed to v;

based on the determined amounts of traffic of said neighbors determining the identity of the neighbor n of r that is the principal source of packets flowing to r that are addressed to v;

continuing one node further upstream from the determined neighbor n of r that is the principal source of packets flowing to r that are addressed to v; and continuing to traceback through interconnected routers until a source of denial-of-service attack packets to v is determined or until further traceback is not possible.

2. A method as in claim 1, wherein the step of determining the set of neighbors comprises a step of sending at least one query to r to obtain information from a MIB that stores IP addresses of routers that are neighbors of r.

3. A method as in claim 1, wherein the step of determining if r is n's next-hop for traffic addressed to v comprises a step of sending at least one query to router n.

4. A method as in claim 3, wherein the step of sending at least one query queries an IP Forwarding Table MIB of router n.

5. A method as in claim 1, wherein the step of determining an amount of traffic comprises a step of sending at least one message to a neighbor router n for determining a count of packets that router n is sending to router r that are addressed to v or to a network on which v resides.

6. A method as in claim 1, and further comprising a step of establishing a black hole host route to v as close as is possible to the source of the denial-of-service attack packets.

7. A method as in claim 1, and further comprising a step of establishing a special host route to v using the same next hop as an existing route, the special host route tracking changes in the existing route such that when a next hop for the existing route changes, the next hop for the host route changes similarly.

8. A method as in claim 1, and further comprising a step of establishing a rate-limit for packets addressed to v as close as is possible to the source of the denial-of-service attack packets.

9. A backtracking unit for tracing a denial-of-service attack on a victim machine back towards its source or sources, comprising a data processor responsive to a traceback computer program stored on a computer-readable media for receiving a first input parameter of an IP address (v) of the victim machine and a second input parameter of an IP address (r) of a router that is immediately upstream of the victim machine, said traceback computer program controlling operation of said data processor to determine a set of routers that are neighbors (n) of r and, for each neighbor n of r, to determine if r is n's next-hop for traffic addressed to v, where node n's next-hop for traffic addressed to v is the IP address of the node that n will forward a packet to if the destination address in the packet is v, said traceback computer program further controlling operation of said data processor for the case where r is not n's next-hop for traffic addressed to v, to skip over n and to query the next neighbor of r, while for the case where r is n's next-hop for traffic addressed to v, to determine an amount of traffic that n is forwarding to r that is addressed to v, based on the determined amounts of traffic of said neighbors, determining the identity of the neighbor n of r that is the principal source of packets flowing to r that are addressed to v or to a network to which v is connected, for continuing further upstream from the determined neighbor n of r that is the principal source of packets flowing to r that are addressed to v to continue to traceback through interconnected routers until a source of denial-of-service attack packets to v is determined, or until further traceback is not possible.

10. A backtracking unit as in claim 9, wherein said data processor operates to send at least one query to r to obtain information from a MIB that stores IP addresses of routers that are neighbors of r.

11. A backtracking unit as in claim 9, wherein said data processor operates to send at least one query to an IP Forwarding Table MIB of router n.

12. A backtracking unit as in claim 9, wherein said data processor, while determining an amount of traffic that n is forwarding to r that is addressed to v, operates under control of said traceback computer program to send at least one message to at least one neighbor router n to determine a count of packets that router n is sending to router r that are addressed to v or to the network to which v is connected.

13. A backtracking unit as in claim 9, wherein said data processor further operates to establish a black hole host route to v as close as is possible to the source of the denial-of-service attack packets.

14. A backtracking unit as in claim 9, wherein said data processor further operates to establish a special host route to v using the same next hop as an existing route, the special host route tracking changes in the existing route such that when a next hop for the existing route changes, the next hop for the host route changes similarly.

15. A backtracking unit as in claim 9, wherein said data processor further operates to establish a rate-limit for packets addressed to v as close as is possible to the source of the denial-of-service attack packets.

16. A method for determining an identity of a source of undesirable packets received from a data communications network, comprising steps of:

operating a traceback function to receive at least one input parameter, namely a network address (v) of a first device receiving the undesirable packets;

determining a set of network routers that are neighbors (n) of a network router (r) that is coupled to a second device immediately upstream of the first device; and querying individual ones of packet routers in order to determine a packet router that is a largest source of packets addressed to v via r, or to a network to which v is connected, and continuing to query packet routers up through a hierarchy of interconnected packet routers until an identity of a source of the undesirable packets is discovered or until further backtracking is not possible.

17. A method as in claim 16, wherein the steps of determining and querying each comprise a step of sending queries to the data communications network.

18. A method as in claim 16, wherein the step of querying comprises steps of:

sending a first network message to a packet router for instructing the packet router to determine a number of packets that it is sending addressed to v; and sending a second network message to the packet router to query the packet router for the determined number.

19. A method as in claim 16, wherein the step of querying comprises a step of sending at least one message to a packet router for determining a number of packets being forwarded to or towards v.

20. A method as in claim 16, and further comprising a step of establishing at least one of a black hole host route to v as close as is possible to the source of the undesirable packets, establishing a special host route to v using the same next hop as an existing route, the special host route tracking changes in the existing route such that when a next hop for the existing route changes, the next hop for the host route changes similarly, and establishing a rate-limit for packets addressed to v as close as is possible to the source of the denial-of-service attack packets.

21. A method as in claim 16, wherein the step of operating the traceback function operates the traceback function on a plurality of selected paths, wherein a particular path is selected based at least on an amount of traffic flowing through the path.

22. A method for tracing a denial-of-service attack on a victim machine back towards its source, comprising steps of:
  operating a traceback program on at least one path to receive two input parameters, (a) an IP address (v) of the victim machine and (b) an IP address (r) of a router that is immediately upstream of the victim machine;
  determining a set of routers that are neighbors (n) of r;
  for each neighbor n of r, determining if r is n's next-hop for traffic addressed to v, or to a network that v is on, where node n's next-hop for traffic addressed to v is the IP address of the node that n will forward a packet to if the destination address in the packet is v;
  if r is not n's next-hop for traffic addressed to v, skip over n and query the next neighbor of r, while if r is n's next-hop for traffic addressed to v, determining an amount of traffic that n is forwarding to r that is addressed to v by sending at least one message to a neighbor router n for determining a count of packets that router n is sending to router r that are addressed to v or to a network on which v resides;
  based on the determined counts of packets of said neighbors n, determining the identity of the neighbor n of r that is the principal source of packets flowing to r that are addressed to v, continuing one node further upstream from the determined neighbor n of r that is the principal source of packets flowing to r that are addressed to v, and continuing to traceback through interconnected routers until a source of denial-of-service attack packets to v is determined or until further traceback is not possible; and
  establishing a black hole host route to v as close as is possible to the source of the denial-of-service attack packets.

23. The method as in claim 22, wherein the step of operating the traceback function operates the traceback function on a plurality of selected paths, wherein a particular path is selected based at least on an amount of traffic flowing through the path.

* * * * *